US010992762B2

(12) United States Patent
Nagaraj et al.

(10) Patent No.: US 10,992,762 B2
(45) Date of Patent: Apr. 27, 2021

(54) PROCESSING LINK IDENTIFIERS IN CLICK RECORDS OF A LOG FILE

(71) Applicant: Verizon Media, Inc., New York, NY (US)

(72) Inventors: Sunil Nagaraj, Sunnyvale, CA (US); Nanda Kumar Jayakumar, Santa Clara, CA (US); Kian-Tat Lim, Palo Alto, CA (US); George Goldenberg, Palo Alto, CA (US)

(73) Assignee: Verizon Media Inc., New York, NY (US)

( * ) Notice: Subject to any disclaimer, the term of this patent is extended or adjusted under 35 U.S.C. 154(b) by 0 days.

(21) Appl. No.: 15/884,209

(22) Filed: Jan. 30, 2018

(65) Prior Publication Data

US 2018/0176313 A1 Jun. 21, 2018

Related U.S. Application Data

(62) Division of application No. 11/690,246, filed on Mar. 23, 2007, now Pat. No. 9,912,766.

(51) Int. Cl.
*G06F 17/00* (2019.01)
*H04L 29/08* (2006.01)
*G06Q 30/00* (2012.01)

(52) U.S. Cl.
CPC .............. *H04L 67/22* (2013.01); *H04L 67/02* (2013.01)

(58) Field of Classification Search
CPC ................................ H04L 67/22; H04L 67/02
USPC ....................................................... 709/224
See application file for complete search history.

(56) References Cited

U.S. PATENT DOCUMENTS

| 6,449,615 | B1 * | 9/2002 | Liu ....................... G06F 16/958 |
| 7,207,006 | B1 * | 4/2007 | Feig ................ H04N 21/234318 |
| | | | 375/E7.008 |
| 7,296,026 | B2 | 11/2007 | Patrick et al. |
| 7,444,358 | B2 | 10/2008 | Paczkowski et al. |
| 7,502,994 | B2 | 3/2009 | Kocol |
| 7,523,191 | B1 | 4/2009 | Thomas et al. |
| 7,552,254 | B1 * | 6/2009 | George ..................... G06F 9/34 |
| | | | 710/58 |
| 7,574,651 | B2 | 8/2009 | Ebrahimi et al. |
| 7,620,628 | B2 | 11/2009 | Kapur et al. |
| 7,631,263 | B2 | 12/2009 | Morris |
| 7,660,815 | B1 | 2/2010 | Scofield et al. |
| 7,685,192 | B1 | 3/2010 | Scofield et al. |
| 7,970,891 | B1 * | 6/2011 | Kontothanssis ....... G06Q 30/02 |
| | | | 709/224 |
| 8,140,611 | B1 * | 3/2012 | Miller ..................... H04L 67/18 |
| | | | 709/201 |
| 8,409,422 | B2 | 4/2013 | Vancina |

(Continued)

OTHER PUBLICATIONS

U.S. Appl. No. 11/690,246, filed Mar. 23, 2007, 33 pages.

(Continued)

*Primary Examiner* — Haresh N Patel
(74) *Attorney, Agent, or Firm* — Cooper Legal Group, LLC

(57) ABSTRACT

Described herein are systems and methods for matching clicks of links on a webpage with page views by a user. The method may comprise identifying a link on a webpage requested by a client device, generating a link identifier for the link and attaching the link identifier to the link. Upon receiving a request for data associated with the link, the link identifier is stored in a log file.

20 Claims, 4 Drawing Sheets

(56) References Cited

U.S. PATENT DOCUMENTS

| | | | |
|---|---|---|---|
| 9,912,766 | B2 | 3/2018 | Nagaraj et al. |
| 10,467,593 | B2* | 11/2019 | White .................... G06Q 10/10 |
| 2002/0010776 | A1* | 1/2002 | Lerner ................ H04L 63/0815 709/225 |
| 2002/0046281 | A1* | 4/2002 | Cope .................. G06F 11/3438 709/227 |
| 2002/0048269 | A1* | 4/2002 | Hong ...................... H04L 29/06 370/389 |
| 2002/0099936 | A1* | 7/2002 | Kou .................... H04L 63/0442 713/151 |
| 2002/0143933 | A1* | 10/2002 | Hind ...................... G06Q 30/02 709/224 |
| 2003/0028517 | A1* | 2/2003 | Nakano ................ G06F 16/958 |
| 2003/0163575 | A1* | 8/2003 | Perkins ................ G06F 9/5055 709/229 |
| 2003/0236701 | A1 | 12/2003 | Rowney et al. |
| 2004/0103426 | A1* | 5/2004 | Ludvig .................. H04H 20/86 725/9 |
| 2004/0181598 | A1* | 9/2004 | Paya .................. G06F 16/9574 709/227 |
| 2004/0243835 | A1* | 12/2004 | Terzis ................ H04L 63/0272 726/3 |
| 2005/0044139 | A1* | 2/2005 | Christian ............... G06Q 30/02 709/203 |
| 2005/0086612 | A1* | 4/2005 | Gettman ............. G06F 3/04815 715/848 |
| 2005/0130638 | A1* | 6/2005 | Schrader ............... H04M 7/006 455/416 |
| 2005/0131944 | A1* | 6/2005 | Patrick .................. G06Q 30/02 |
| 2005/0166053 | A1 | 7/2005 | Cui et al. |
| 2006/0041562 | A1* | 2/2006 | Paczkowski ........ G06F 16/9562 709/224 |
| 2006/0104174 | A1* | 5/2006 | Kelly .................... G06F 16/957 369/47.1 |
| 2006/0106793 | A1* | 5/2006 | Liang .................. G06F 16/3338 |
| 2006/0122979 | A1 | 6/2006 | Kapur et al. |
| 2006/0136294 | A1 | 6/2006 | Linden et al. |
| 2006/0277157 | A1* | 12/2006 | Seidl ................ G06F 16/24575 |
| 2006/0282763 | A1 | 12/2006 | Ong |
| 2007/0011340 | A1* | 1/2007 | Seidl ..................... G06F 16/958 709/228 |
| 2007/0050257 | A1* | 3/2007 | Fine ...................... G06Q 30/02 705/14.56 |
| 2007/0078904 | A1* | 4/2007 | Yoon .................... G06F 16/958 |
| 2007/0112800 | A1* | 5/2007 | Seidl ..................... G06Q 30/02 |
| 2007/0162396 | A1* | 7/2007 | Goldman ........... G06Q 30/0241 705/51 |
| 2007/0180048 | A1* | 8/2007 | Crick .................... G06F 21/335 709/217 |
| 2007/0208699 | A1* | 9/2007 | Uetabira ............... G06F 16/951 |
| 2007/0226206 | A1 | 9/2007 | Pavlovski et al. |
| 2007/0239542 | A1 | 10/2007 | Shapiro |
| 2007/0245137 | A1 | 10/2007 | Bhagat et al. |
| 2007/0266311 | A1* | 11/2007 | Westphal ............. G06F 16/954 715/700 |
| 2007/0283291 | A1 | 12/2007 | Morris |
| 2008/0034425 | A1* | 2/2008 | Overcash ................ G06F 21/55 726/22 |
| 2008/0065472 | A1 | 3/2008 | Patrick et al. |
| 2008/0082405 | A1 | 4/2008 | Martinez et al. |
| 2008/0082904 | A1 | 4/2008 | Martinez et al. |
| 2008/0082905 | A1 | 4/2008 | Martinez et al. |
| 2008/0104224 | A1* | 5/2008 | Litofsky ............. H04L 43/0852 709/224 |
| 2008/0140765 | A1 | 6/2008 | Kelaita et al. |
| 2008/0154951 | A1 | 6/2008 | Martinez et al. |
| 2008/0209028 | A1 | 8/2008 | Kurup et al. |
| 2008/0235368 | A1* | 9/2008 | Nagaraj .................. H04L 67/02 709/224 |
| 2009/0144395 | A1* | 6/2009 | DeSalvo ............. G06F 16/9574 709/219 |
| 2010/0042621 | A1 | 2/2010 | Morris |

OTHER PUBLICATIONS

U.S. Appl. No. 11/690,246: Pre-Exam Formalities Notice, filed Apr. 17, 2007, 2 pages.
U.S. Appl. No. 11/690,246 filed Apr. 17, 2007, 3 pages.
U.S. Appl. No. 11/690,246: Applicant Response to Pre-Exam Formalities Notice, dated Jul. 17, 2007, 3 pages.
U.S. Appl. No. 11/690,246, filled Jul. 26, 2007, 3 pages.
U.S. Appl. No. 11/690,246: Preliminary Amendment, dated Oct. 29, 2007, 7 pages.
U.S. Appl. No. 11/690,246: Notice of Publication, dated Sep. 25, 2008, 1 page.
U.S. Appl. No. 11/690,246: Requirement for Restriction/Election, dated Sep. 11, 2009, 7 pages.
U.S. Appl. No. 11/690,246: Response to Election/Restriction Filed. Oct. 5, 2009, 2 pages.
U.S. Appl. No. 11/690,246: Non-Final Rejection, dated Dec. 30, 2009, 15 pages.
U.S. Appl. No. 11/690,246: Amendment/Req. Reconsideration—After Non-Final Reject, dated Mar. 30, 2010, 12 pages.
U.S. Appl. No. 11/690,246: Final Rejection, dated Jun. 24, 2010, 16 pages.
U.S. Appl. No. 11/690,246: RCE and Amendments, dated Sep. 23, 2010, 10 pages.
U.S. Appl. No. 11/690,246: Non-Final Rejection, dated Mar. 10, 2014, 27 pages.
U.S. Appl. No. 11/690,246: Amendment/Req. Reconsideration—After Non-Final Reject, dated Jun. 10, 2014, 18 pages.
U.S. Appl. No. 11/690,246: Final Rejection, dated Aug. 7, 2014, 27 pages.
U.S. Appl. No. 11/690,246: Response After Final Action, dated Sep. 30, 2014, 22 pages.
U.S. Appl. No. 11/690,246: RCE and Amendments, dated Nov. 7, 2014, 23 pages.
U.S. Appl. No. 11/690,246 : Non-Final Rejection, dated Dec. 16, 2014, 27 pages.
U.S. Appl. No. 11/690,246: Amendment/Req. Reconsideration—After Non-Final Reject, dated Mar. 16, 2015, 24 pages.
U.S. Appl. No. 11/690,246: Final Rejection, dated May 19, 2015, 29 pages.
U.S. Appl. No. 11/690,246: Amendment/Req. Reconsideration—After Non-Final Reject, dated Aug. 19, 2015, 24 pages.
U.S. Appl. No. 11/690,246: RCE and Amendments, dated Sep. 21, 2015, 27 pages.
U.S. Appl. No. 11/690,246: After Final Consideration Program Decision, filed Sep. 1, 2015, 1 page.
U.S. Appl. No. 11/690,246: Advisory Action, dated Sep. 1, 2015, 3 pages.
U.S. Appl. No. 11/690,246: RCE and Amendments, dated Sep. 21, 2015, 25 pages.
U.S. Appl. No. 11/690,246: Non-Final Rejection, dated Oct. 30, 2015, 12 pages.
U.S. Appl. No. 11/690,246: Amendment/Req. Reconsideration—After Non-Final Reject, dated Jan. 29, 2016, 19 pages.
U.S. Appl. No. 11/690,246: Final Rejection, dated Feb. 8, 2016, 27 pages.
U.S. Appl. No. 11/690,246: Amendment/Req. Reconsideration—After Non-Final Reject, dated Apr. 8, 2016, 21 pages.
U.S. Appl. No. 11/690,246: Advisory Action, dated Apr. 15, 2016, 3 pages.
U.S. Appl. No. 11/690,246: RCE and Amendment, dated May 9, 2016, 22 pages.
U.S. Appl. No. 11/690,246: Non-Final Rejection, dated Jun. 9, 2016, 36 pages.
U.S. Appl. No. 11/690,246: Amendment/Req. Reconsideration—After Non-Final Reject, dated Sep. 9, 2016, 47 pages.
U.S. Appl. No. 11/690,246: Final Rejection, dated Dec. 2, 2016, 35 pages.
U.S. Appl. No. 11/690,246: Advisory Action, dated Feb. 13, 2017, 10 pages.
U.S. Appl. No. 11/690,246: RCE and Amendments, dated Mar. 2, 2017, 31 pages.

(56) References Cited

OTHER PUBLICATIONS

U.S. Appl. No. 11/690,246: Non-Final Rejection, dated Jul. 5, 2017, 44 pages.
U.S. Appl. No. 11/690,246: RCE, filed Oct. 5, 2017, 11 pages.
U.S. Appl. No. 11/690,246: Amendment/Req. Reconsideration—After Non-Final Reject, dated Oct. 5, 2017, 30 pages.
U.S. Appl. No. 11/690,246, filed Oct. 10, 2017, 4 pages.
U.S. Appl. No. 11/690,246: Notice of Allowance and Fees Due, dated Oct. 30, 2017, 7 pages.
U.S. Appl. No. 11/690,246: Issue Fee Payment, dated Jan. 19, 2018, 1 page.

\* cited by examiner

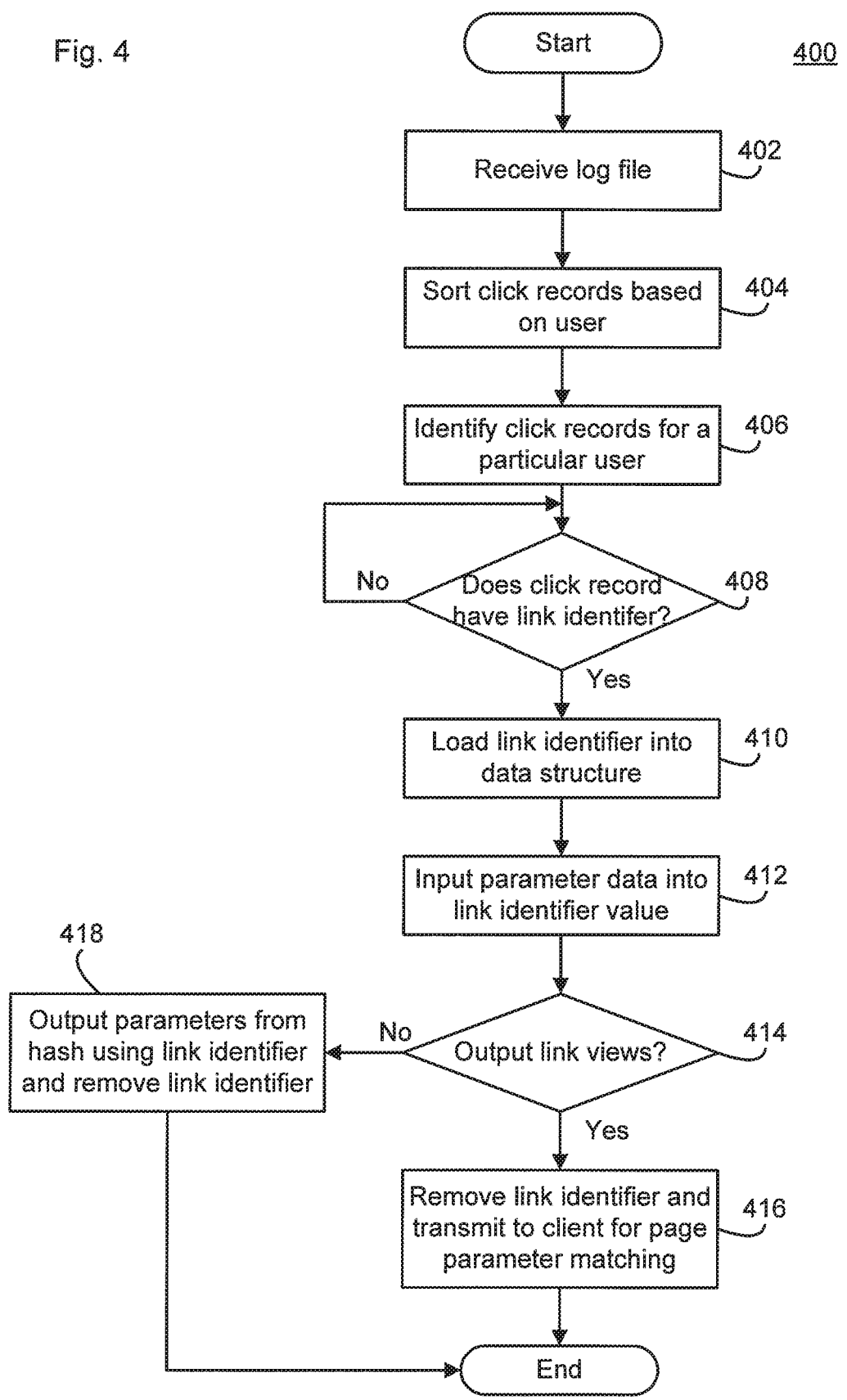

PROCESSING LINK IDENTIFIERS IN CLICK RECORDS OF A LOG FILE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to monitoring network traffic. More specifically, the present invention relates to matching clicks of links on a webpage with page views by a user.

BACKGROUND OF THE INVENTION

Link tracking may be used to monitor HyperText Transfer Protocol (HTTP) traffic on a large network of websites at page, subpage and link levels. Each HTTP request for a tracked portion of a webpage causes information to be logged on a web server at a link level and a page level, identifying the HTTP request for the tracked portion of the webpage. Typically, the HTTP requests are organized into page views which include respective sets of link views, as a user may have clicked on multiple links on the same webpage. The information that the web server logs may then be analyzed to determine how users are navigating through the website, a click frequency for each page, subpage, and/or link, a conversion rate, etc.

Conventionally, website owners perform link tracking by adding tracking information to every hyperlink that was going to be tracked. However, adding the tracking information to a plurality of hyperlinks in a webpage can significantly increase a size of the webpage, requiring more storage space on the web server and resulting in a greater webpage load times. If the webpage requires a significant load time, the user may abort loading the webpage, which may result in the frequency with which the website is visited decreasing. Because many websites generate revenue through advertising, a decrease in views or use of the website may result in decreased advertising revenues.

Thus, there exists a need to provide tracking or otherwise monitor user navigation through a website without adversely affecting the user's experience.

SUMMARY OF THE INVENTION

The present invention relates to a system and method for monitoring network traffic. The method comprises the steps of identifying a link on a webpage requested by a client device, generating a link identifier for the link, attaching the link identifier to the link and, upon receiving a request for data associated with the link, storing the link identifier in a log file. The identifying step may include determining whether the link is a tracked link utilizing at least one predetermined criteria. The generating step may include formatting the link identifier in a first format when a browser cookie is received from the client device, and formatting the link identifier in a second format when the browser cookie is not received from the client device. The first format may have a first size and the second format may have a second size. The first size may be between twenty-one and twenty-eight bytes. The second size may be between eighteen and twenty-four bytes.

The first format may include at least one of (i) a type identifier indicative of the first format, (ii) a checksum and (iii) a space identifier indicative of at least a portion of the webpage. The method may further include generating the checksum as a hash of at least one of (i) at least one local group parameter, (ii) the browser cookie, (iii) a sub-cookie, (iv) a global parameter group name and (v) at least one link parameter. The method may further include storing at least one of the checksum and the space identifier in a storage file.

The step of storing according to an exemplary embodiment of the invention may include identifying a component of the link identifier as a common component, the common component included in a plurality of stored link identifiers, and storing the link identifier with the plurality of stored link identifiers. The second format may include at least one of (i) a type identifier indicative of the second format, (ii) an Internet Protocol (IP) address of a web server, (iii) a timestamp, (iv) a process identifier indicative of a process executed by the web server, (v) a sequence number associated with the process and (vi) a space identifier indicative of at least a portion of the webpage.

In another exemplary embodiment, the method comprises receiving a log file including a plurality of click records, the click records indicative of links on webpages that have been clicked by one or more users, detecting link identifiers in the click records, and outputting at least one parameter associated with a given one of the link identifiers. The method may further include separating the click records into a plurality of groups based on one of (i) a browser cookie and (ii) a timestamp associated with each of the links. The method may further include loading the link identifiers into a hash.

When a given link identifier may have a first format, the at least one parameter may be at least one of a checksum and a space identifier. When a given link identifier has a second format, the at least one parameter may be at least one of (i) an Internet Protocol (IP) address of a web server, (ii) a timestamp, (iii) a process identifier indicative of a process executed by the web server, (iv) a sequence number associated with the process and (v) a space identifier indicative of at least a portion of the webpage therewith.

The method may further comprise the steps of removing the link identifiers prior to the outputting, and ordering the link identifiers prior to the outputting based on at least one of (i) a browser cookie, (ii) a match time and (iii) a view time.

A system according to an exemplary embodiment of the invention may comprise a plurality of web servers storing link identifiers for click records in local log files, a given click record including a given link identifier and at least one parameter indicative of a link and a webpage associated with the link identifier, and a central server sorting the click records into groups based on at least one of a browser cookie and a timestamp associated with a give click record, the central server outputting the at least one parameter for the click records in a given group. The central server may load the link identifiers from the click records into a hash.

When a given link identifier has a first format, the at least one parameter may be at least one of a checksum and a space identifier. When a given link identifier ahs a second format, the at least one parameter may be at least one of (i) an Internet Protocol (IP) address of a web server, (ii) a timestamp, (iii) a process identifier indicative of a process executed by the web server, (iv) a sequence number associated with the process and (v) a space identifier indicative of at least a portion of the webpage therewith.

The central server may remove the link identifiers prior to the outputting. The central server orders the link identifiers prior to the outputting based on at least one of (i) the browser cookie, (ii) a match time and (iii) a view time.

An exemplary embodiment of a computer-readable storage medium according to the present invention may store a set of instructions, the set of instructions capable of being executed by a processor. The set of instructions may perform the steps of detecting link identifiers in a plurality of click records, the click records indicative of links on webpages that have been clicked by one or more users, and outputting at least one parameter associated with a given one of the link identifiers.

The instructions may further comprise the step of separating the click records into a plurality of groups based on one of (i) a browser cookie and (ii) a timestamp associated with each of the links. The instructions may further comprise the step of loading the link identifiers into a hash.

When a given link identifier has a first format, the at least one parameter may be at least one of a checksum and a space identifier. When a given link identifier has a second format, the at least one parameter may be at least one of (i) an Internet Protocol (IP) address of a web server, (ii) a timestamp, (iii) a process identifier indicative of a process executed by the web server, (iv) a sequence number associated with the process and (v) a space identifier indicative of at least a portion of the webpage therewith.

The instructions may further comprise the step of removing the link identifiers prior to the outputting. The instructions may further comprise the step of ordering the link identifiers prior to the outputting based on at least one of (i) a browser cookie, (ii) a match time and (iii) a view time.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 4 illustrates an exemplary embodiment of a method for performing a link-matching operation according to one embodiment of the present invention.

DETAILED DESCRIPTION OF THE PREFERRED EMBODIMENTS

In the following description of the preferred embodiments, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
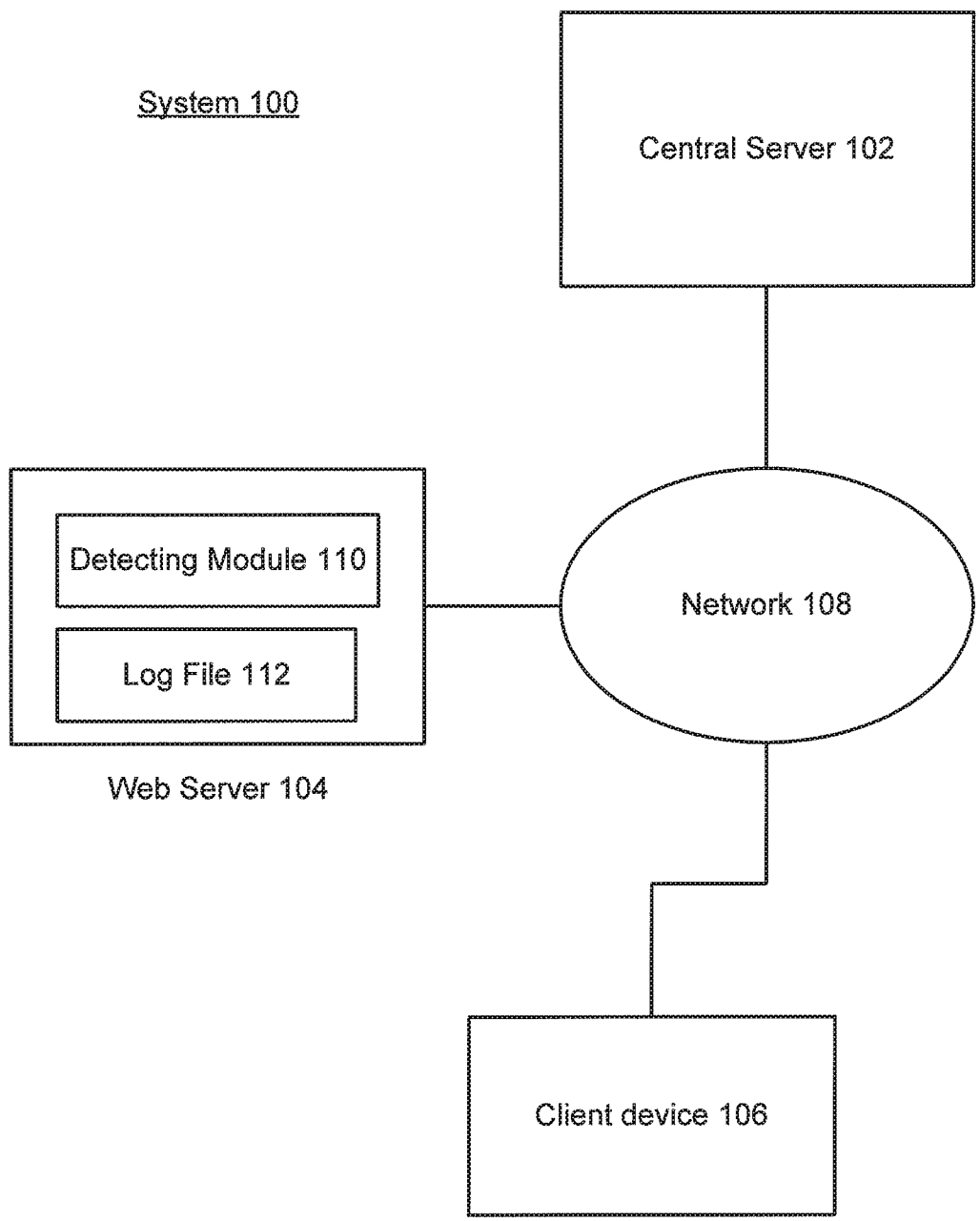
FIG. 1 illustrates an exemplary embodiment of a system for monitoring network traffic according to one embodiment of the present invention.

FIG. 1 shows an exemplary embodiment of a system 100 for monitoring network traffic according to the present invention. The system 100 may comprise a central server 102, a web server 104 and a client device 106, which are communicatively interconnected via a communications network 108 (e.g., a wired/wireless LAN/WAN, a cellular network, the Internet, an intranet, a VPN, a PSTN, etc.). The servers 102 and 104 and the client device 106, may be processor-based computing devices which include memory and network connection ports for communicating data on the network 108. For example, the client device 106 may be a PC, laptop, mobile phone, PDA, tablet computer, handheld computer, smart appliance (e.g., scanner, copier, facsimile machine), etc. which utilizes a web browser (or command-line interface) for allowing a user to interface with devices on the network 108. Those of skill in the art understand that any number and type of client devices 106 may be connected to the network 108.

The web server 104 may be a destination server, a redirect server, an Internet cache, etc. which serves webpages (or routes webpages) to the client device 106. Those of skill in the art understand that a plurality of web servers may be coupled to the network 108. In the exemplary embodiment, link identifiers are added to links on a webpage before the webpage is served to the client device 106. The link identifiers allow the system 100 to track clicks or views of the links. A given web server 104 may utilize a detection module 110 to determine whether a link that a user clicks has a link identifier associated therewith. If the module detects a link identifier, the module may store the link identifier and other information regarding the link in a log file 112, which a central server 102 may analyze and process. In another exemplary embodiment, the web server 104 may analyze and process the log file 112. For example, this embodiment may be utilized when only several servers are coupled to the network 108 (e.g., an intranet). The methods for generating, detecting and processing the link identifiers are described in more detail below.

Figure 2:
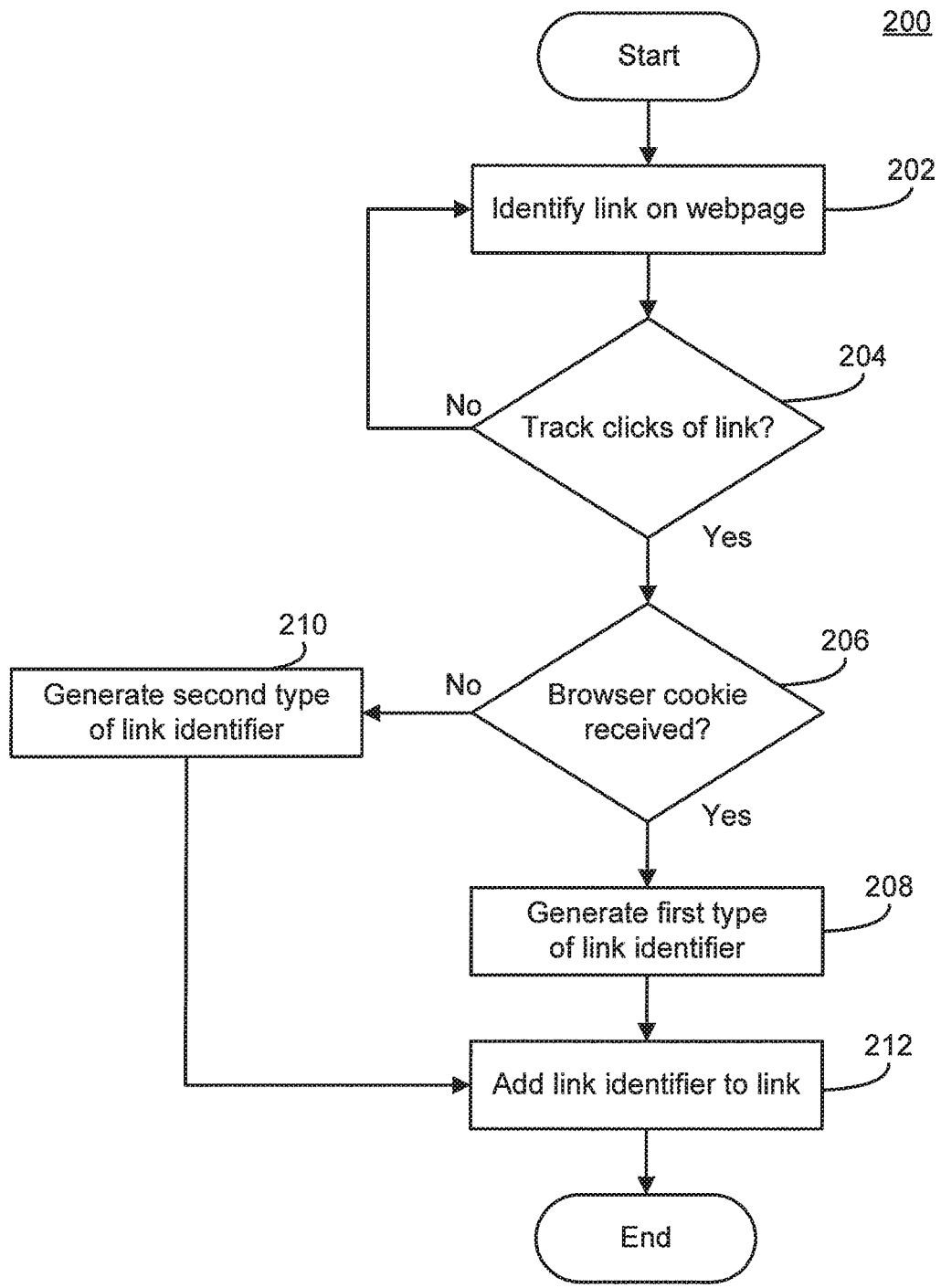
FIG. 2 illustrates an exemplary embodiment of a method for generating a link identifier according to one embodiment of the present invention.

FIG. 2 illustrates an exemplary embodiment of a method 200 for generating a link identifier according to one embodiment of the present invention. In step 202, the web server 104 identifies a link on a webpage. The webpage may be located on the web server 104 in response to an HTTP request from the client device 106. The link may be represented as text, a graphic(s), an image map, video or any combination thereof. The link may include a destination identifier indicative of a location to which the link leads. According to one embodiment, when the user clicks a given link, the web browser on the client device 106 generates and transmits an HTTP request for a content item (e.g., data file, image, video, audio, etc.) located at the destination address.

In step 204, the web server 104 determines whether the link(s) on the webpage are tracked links. The web server 104 may utilize one or more predetermined criteria for determining whether the link is a tracked link. For example, the predetermined criteria may indicate that only links to advertisers' websites are tracked links. That is, the website may comprise multiple webpages including advertisements (e.g., banner ads, keyword ads, etc.) that, when clicked, generate an HTTP request for a URL associated therewith. The predetermined criteria may differentiate between intra-site links (e.g., links to webpages within the same website) and the links to the advertisers' webpages. Those of skill in the art understand that any predetermined criteria may be utilized to determine which links are tracked links, and the predetermined criteria may be updated, modified or replaced at predetermined intervals or asynchronously. If the link is not a tracked link, a subsequent link in the webpage may be analyzed.

In step 206, the web server 104 determines whether a browser cookie has been received with the HTTP request. If the browser cookie has been received from the client device 106, the web server 104 generates a first type of link identifier for the link, as shown in step 208. The first type of link identifier may have a first predetermined size (e.g., 28 bytes encoded on a URL) and include a predetermined prefix (e.g., ";_ylt="), which indicates that clicks of the link will be tracked.

The first type of link identifier may further include first data indicative of, for example, a type of link identifier (e.g., the first type when the browser cookie has been received), a checksum and a space identifier of the webpage being viewed or served. The first type of link identifier may be the same for all of the link identifiers generated in response to the HTTP request. The checksum may be generated as an MD5 hash of one or more of the following: local group parameters, the browser cookie, a sub-cookie, a global parameter group name and sorted link parameters.

If the browser cookie was not received with the HTTP request, the web server 104 generates a second type of link identifier, as shown in step 210. The second type of link identifier may have a second predetermined size (e.g., 24 bytes encoded for a URL) and further include the predetermined prefix to indicate that the link is a tracked link. The second type of link identifier may further include second data indicative of, for example, a type of link identifier (e.g., the second type when the browser cookie has not been received), an Internet protocol (IP) address of the web server 104, a timestamp to identify a start time of the HTTP request, a process identifier indicative of a server process or subroutine executed by the web server 104, a sequence number associated with the server process or subroutine and a space identifier indicative of the webpage being viewed or served. As understood by those of skill in the art, the timestamp and the space identifier may be the same for all link identifiers generated in response to the HTTP request.

In step 212, the link identifier (generated in step 208 or 210) may be appended to the tracked link in the webpage. The method 200 may be performed for all or selected ones of the links included in the webpage so that each link which is to be tracked is given a link identifier. The webpage may then be served to the client device 106. Alternatively, the process may be performed offline such a given tracked links has a link identifier appended thereto when the user submits a request for the tracked link.

Figure 3:
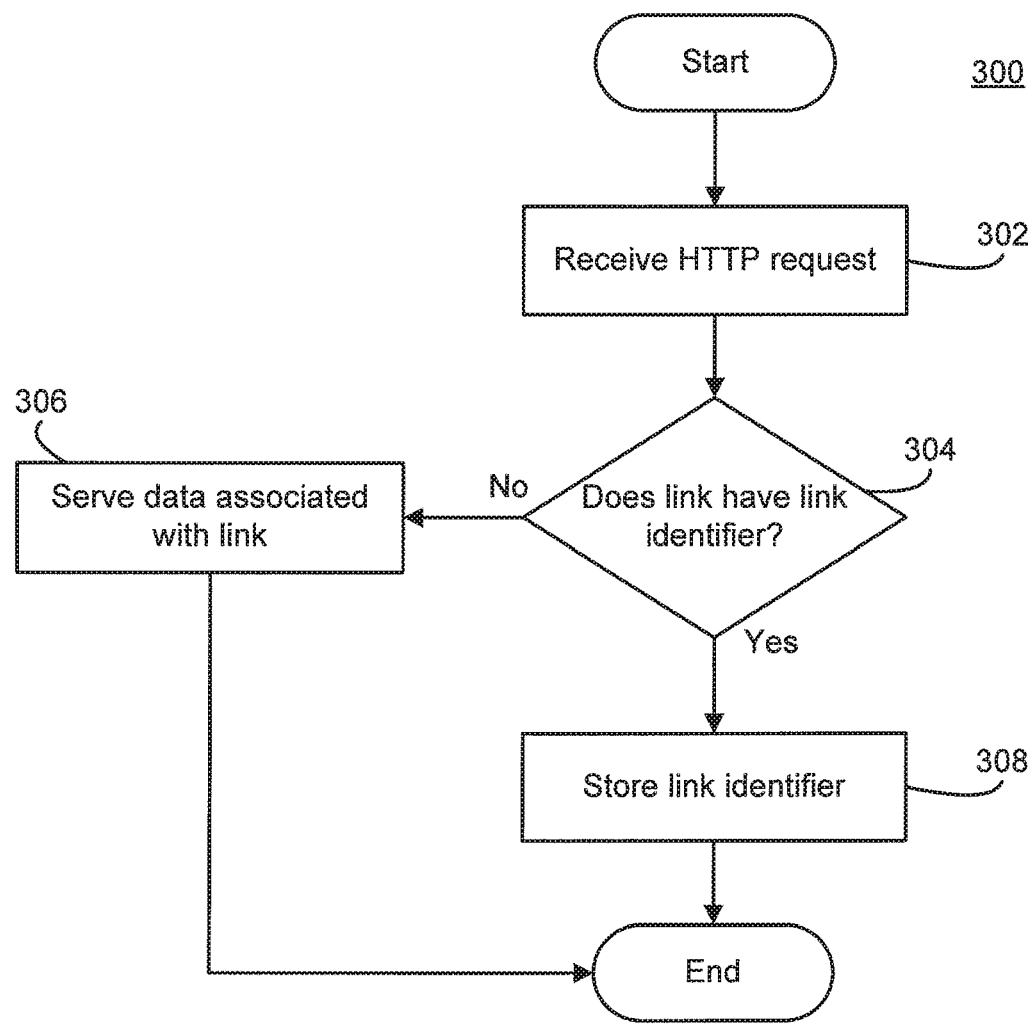
FIG. 3 illustrates an exemplary embodiment of a method for storing a link identifier according to one embodiment of the present invention.

FIG. 3 illustrates an exemplary embodiment of a method 300 for storing a link identifier according to one embodiment of the present invention. As described above, in response to the HTTP request, the web server may generate a link identifier for one or more links in the requested web page that are tracked links. A given link identifier is appended to the corresponding link and the web page is served to the client device.

In step 302, the web server 104 receives an HTTP request that a client device generates as a result of a click on a link in the webpage that the client displays in the web browser on the client device. In step 304, the detection module on the web server may analyze the link associated with the HTTP request to determine whether a link identifier is attached to the link. If the link does not include a link identifier, the web server may serve data associated with the link as is conventionally known to those of skill in the art, as shown in step 306.

In step 308, the detection module detects a link identifier (step 304) and stores the link identifier (or a portion thereof) in the log file. For example, the web server may store data indicating the type of link identifier. When the link identifier is the first type, the checksum or the space identifier may be stored (e.g., as one or more ASCII strings) in the log file 112 or in a separate storage location. The web server 104 may store the checksum or recompute the checksum from the browser cookie and other data received with the HTTP request. As understood by those of skill in the art, recomputing the checksum may require additional processing time, impacting the time required for analyzing the links and processing the link identifiers. Using the original checksum, however, may prevent cookie spoofing.

When the link identifier is the second type, one or more of the parameters associated with the link identifier (e.g., the IP address of the web server, the timestamp, the process identifier, the sequence number and the space identifier) may be stored (e.g., as one or more ASCII strings) in the log file or the separate storage location.

Storing the link identifier may be optimized by, for example, extracting components of the link identifier which are common to other link identifiers and generating a data structure that identifies both the common components of the link identifiers and components unique to one or more of the link identifiers. For example, when the link identifier is the first type, the space identifier may be the same for one or more of the link identifiers generated for a given HTTP request. Thus, the space identifier may correspond to all of the link identifiers generated in response to the given HTTP request.

FIG. 4 illustrates an exemplary embodiment of a method 400 for performing a link matching operation according to one embodiment of the present invention. In step 402, the central server receives the log file (or data therein) from the web server. The log file may be uploaded to or retrieved by the central server at a predetermined time, when the log file reaches a predetermined size, etc. Those of skill in the art understand that in another exemplary embodiment, the web server 104 may implement the method 400.

As described above, the log file may contain data ("click records") indicating links (tracked and non-tracked) that were clicked on by users on webpages served by the web server. Although the exemplary embodiment of the method 400 is described with reference to the log file of the web server, those of skill in the art understand that the central server may process log files from other web servers in parallel or in conjunction with the log file from the web server.

In step 404, the click records in the log file are sorted. The click records may be sorted by cookie data associated with a given click record. For example, the click records may be separated into buckets associated with browser cookies identified in the individual click records. Thus, upon completion, a given one of the buckets may be associated with a given browser cookie. The remaining click records, which are "uncookied," may be sorted based on timestamps associated therewith. Furthermore, each page view may have a corresponding set of link views.

In step 406, the click records associated with a given browser cookie (or a given timestamp(s)) are identified as pertaining to a particular user, browser or device (e.g., client device 106). In step 408, it is determined whether a given click record in the bucket includes a link identifier. If the link identifier is detected, it is loaded into a predefined data structure (e.g., a hash), as shown in step 410. Steps 408 and 410 may be iterated over one or more of the click records associated with the particular user so that the hash includes all of the link identifiers from the click records.

In step 412, parameters associated with the link identifiers in the hash are populated. For example, if the link identifier is the first type, the corresponding checksum and space identifier may be associated therewith. According to one embodiment, the parameters associated with the link identifiers in the hash are populated with information that the web server provides, which according to one embodiment the web server provides through transmission of the log file. Step 412 may be performed for one or more of the link identifiers in the hash. Thus, after step 412, the hash may include one or more of the link identifiers and the link or page parameters corresponding thereto.

In step 414, it is determined whether page views, link views or link clicks are to be output (e.g., written to memory) and in what order (e.g., by browser cookie, by match-time, by view-time). If the link views are to be output, the method 400 proceeds to step 416 in which the link identifiers are removed from the hash and client-side page parameter matching may be performed. If the link clicks are to be output, the method 400 proceeds to step 418 in which the parameters are obtained from the hash using the link identifier, the link identifiers are removed and the parameters are output.

FIGS. 1 through 6 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method, comprising:
    processing, by a server, a log file obtained from a remote network device via a network, the log file including click records, the click records indicative of links on webpages that have been clicked by one or more users;
    detecting, by the server, link identifiers in at least a portion of the click records, each of the link identifiers indicating that a corresponding one of the links is a tracked link;
    determining, by the server, at least one parameter, comprising at least one of a checksum, a space identifier, an Internet Protocol (IP) address of a web server, a timestamp, a process identifier indicative of a process executed by the web server, or a sequence number associated with the process, associated with at least one of the link identifiers based, at least in part, on at least one format of at least one of the link identifiers, wherein the determining comprises:
        determining a first parameter, comprising at least one of the checksum or the space identifier, associated with a first link identifier of the link identifiers based, at least in part, on a first format of the first link identifier; and
        determining a second parameter, comprising at least one of the IP address of the web server, the timestamp, the process identifier indicative of the process executed by the web server, the sequence number associated with the process, or a second space identifier indicative of at least a portion of a webpage, associated with a second link identifier of the link identifiers based, at least in part, on a second format of the second link identifier, wherein the first parameter is different than the second parameter and the first format is different than the second format; and storing, by the server, the at least one parameter in at least one memory.

2. The method according to claim 1, comprising:

separating the click records into a plurality of groups based, at least in part, on at least one of a browser cookie, or a timestamp associated with each of the links.

3. The method according to claim 2, comprising:

loading the link identifiers into a data structure.

4. The method according to claim 3, wherein the first parameter comprises the space identifier.

5. The method according to claim 3, wherein the second parameter comprises the sequence number associated with the process.

6. The method according to claim 3, comprising:

obtaining the link identifiers from the log file prior to the determining the at least one parameter.

7. The method according to claim 6, comprising:

ordering the link identifiers prior to the determining the at least one parameter based, at least in part, on at least one of a second browser cookie, a match time, or a view time.

8. A computer program product, comprising one or more non-transitory computer readable media having computer program instructions stored therein, the computer program instructions being configured such that, when executed by one or more processors, the computer program instructions cause the one or more processors to:

detect link identifiers in click records, the click records indicative of links on webpages that have been clicked by one or more users, each of the link identifiers indicating that a corresponding one of the links is a tracked link;

determine at least one parameter, comprising at least one of a checksum, a space identifier, an Internet Protocol (IP) address of a web server, a timestamp, a process identifier indicative of a process executed by the web server, or a sequence number associated with the process, associated with at least one of the link identifiers based, at least in part, on at least one format of at least one of the link identifiers, wherein the determining comprises:

determining a first parameter, comprising at least one of the checksum or the space identifier, associated with a first link identifier of the link identifiers based, at least in part, on a first format of the first link identifier; and determining a second parameter, comprising at least one of the IP address of the web server, the timestamp, the process identifier indicative of the process executed by the web server, the sequence number associated with the process, or a second space identifier indicative of at least a portion of a webpage, associated with a second link identifier of the link identifiers based, at least in part, on a second format of the second link identifier, wherein the first parameter is different than the second parameter and the first format is different than the second format; and store the at least one parameter in at least one memory of a computing device.

9. The computer program product according to claim 8, wherein the first parameter comprises the checksum and the second parameter comprises the IP address of the web server.

10. The computer program product according to claim 8, wherein the first parameter comprises the checksum and the second parameter comprises the timestamp.

11. The computer program product according to claim 8, wherein the first parameter comprises the checksum and the second parameter comprises the process identifier indicative of the process executed by the web server.

12. The computer program product according to claim 8, wherein the first parameter comprises the checksum and the second parameter comprises the sequence number associated with the process.

13. The computer program product according to claim 8, wherein the first parameter comprises the checksum and the second parameter comprises the second space identifier indicative of at least the portion of the webpage.

14. The computer program product according to claim 8, wherein the first parameter comprises the space identifier and the second parameter comprises the IP address of the web server.

15. The computer program product according to claim 8, wherein the first parameter comprises the space identifier and the second parameter comprises the timestamp.

16. The computer program product according to claim 8, wherein the first parameter comprises the space identifier and the second parameter comprises the process identifier indicative of the process executed by the web server.

17. The computer program product according to claim 8, wherein the first parameter comprises the space identifier and the second parameter comprises the sequence number associated with the process.

18. The computer program product according to claim 8, wherein the first parameter comprises the space identifier and the second parameter comprises the second space identifier indicative of at least the portion of the webpage.

19. A system, comprising:

a processor; and memory comprising processor-executable instructions that when executed by the processor cause performance of operations, the operations comprising:

detecting link identifiers in click records, the click records indicative of links on webpages that have been clicked by one or more users, each of the link identifiers indicating that a corresponding one of the links is a tracked link;

determining at least one parameter, comprising at least one of a checksum, a space identifier, an Internet Protocol (IP) address of a web server, a timestamp, a process identifier indicative of a process executed by the web server, or a sequence number associated with the process, associated with at least one of the link identifiers based, at least in part, on at least one format of at least one of the link identifiers, wherein the determining comprises:

determining a first parameter, comprising at least one of the checksum or the space identifier, associated with a first link identifier of the link identifiers based, at least in part, on a first format of the first link identifier; and determining a second parameter, comprising at least one of the IP address of the web server, the timestamp, the process identifier indicative of the process executed by the web server, the sequence number associated with the process, or a second space identifier indicative of at least a portion of a webpage, associated with a second link identifier of the link identifiers based, at least in part, on a second format of the second link identifier, wherein the first parameter is different than the second parameter and the first format is different than the second format; and storing the at least one parameter in at least one memory of a computing device.

20. The system according to claim 19, the operations comprising:

ordering the link identifiers prior to the determining the at least one parameter based, at least in part, on at least one of a second browser cookie, a match time, or a view time.

* * * * *